Feb. 11, 1941. S. L. BURGWIN ET AL 2,231,702
STRAIN GAUGE
Filed Feb. 25, 1939

WITNESSES:

INVENTORS
Stephen L. Burgwin and
Bernard F. Langer.
ATTORNEY

Patented Feb. 11, 1941

2,231,702

UNITED STATES PATENT OFFICE 2,231,702

STRAIN GAUGE

Stephen L. Burgwin, Forest Hills, and Bernard F. Langer, Pittsburgh, Pa., assignors to Westinghouse Electric & Manufacturing Company, East Pittsburgh, Pa., a corporation of Pennsylvania Application February 25, 1939, Serial No. 258,510

3 Claims. (Cl. 73—51)

Our invention relates, generally, to strain gauges and, more particularly, to strain gauges of the magnetic type.

It has been common practice to measure the strain or deformation of materials under stress or the relative movement of two points, by causing such strain, deformation or movement to vary the coupling of inductive circuits and measuring the extent of the variation of this coupling. The systems used heretofore for this purpose have been relatively complex, expensive and inefficient in operation.

An object of our invention is to provide a strain gauge circuit which shall function simply and efficiently, which shall require a minimum number of parts, which shall be inexpensive to manufacture, install and maintain, and which shall provide a maximum of indicator energizing current for a given degree of strain to be measured.

Figure 1:
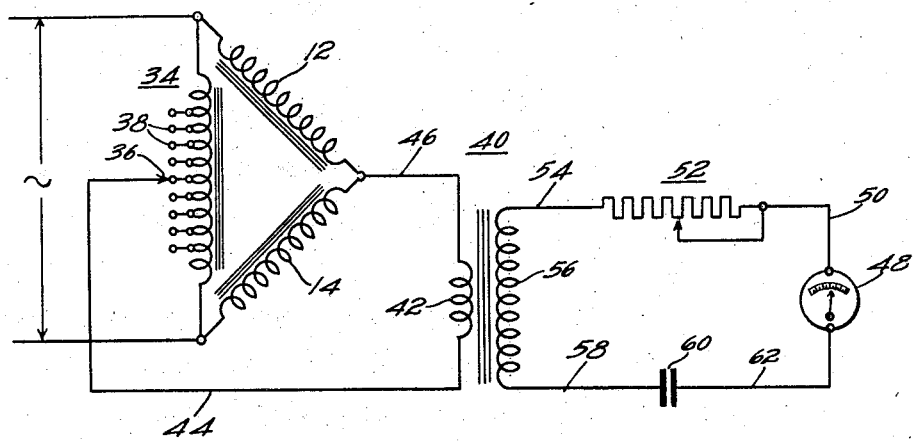
Figure 2:
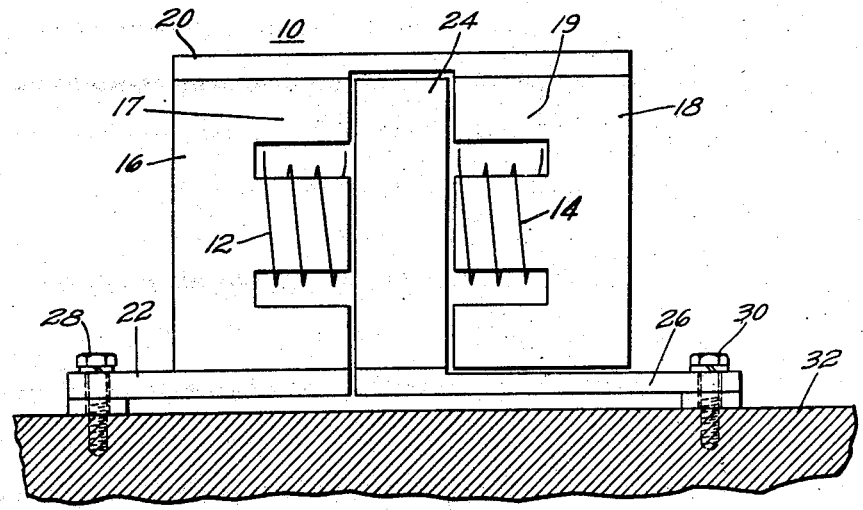

Other objects and advantages of the invention will be apparent from the following detailed description taken in connection with the accompanying drawing, in which:

Figure 1 is a diagrammatic representation of a strain gauge circuit embodying the principal features of our invention, and Fig. 2 is a schematic side elevation view of a magnetic strain gauge unit which may be used as the actuating unit in practicing our invention.

Referring to the drawing, the strain gauge unit 10 shown comprises windings 12 and 14 mounted upon the middle leg of E-shaped laminated iron cores 16 and 18, respectively. The cores 16 and 18 are spaced apart and are rigidly connected together by a bar member 20. The core 16 is mounted on a supporting bar 22.

A laminated iron armature 24 is mounted for movement between the core members 16 and 18 on a supporting bar 26. Thus two inductors 17 and 19, comprising the windings 12 and 14 with their associated cores 16 and 18 and the common armature 24 are provided. The supporting bars 22 and 26 may be secured in any suitable manner such as by bolts 28 and 30 to the member 32 whose strain it is desired to determine. It will be seen that any elongation or shortening of the member 32 between the points at which the bars 22 and 26 are secured to the member 32 will cause the armature 24 to move toward one and away from the other of the core members 16 and 18, thus simultaneously increasing the reactance of one of the inductors 17 and 19 and decreasing the reactance of the other.

The circuit which is made responsive to the relative movement of the armature 24 and core members 16 and 18 is shown in Fig. 1. The windings 12 and 14 are connected in series circuit relation across a source of alternating current as indicated. An inductor 34 has its winding connected to the source of alternating current across the series connected windings 12 and 14 as indicated. The inductor 34 may be in the form of an auto-transformer having its winding tapped and provided with a movable contact arm 36 which may be moved into engagement with any one of a series of contact elements 38 which are connected to different turns of the tapped windings of the inductor 34. It is to be understood that the inductor 34 may be of any suitable type, it being necessary only that the relative inductance values between the turn of the winding connected to the contact element 36 and the respective ends of the inductor be variable by moving the contact element 36 to form a connection with any of the turns of the winding of inductor 34.

It will be seen that this circuit arrangement of the windings 12 and 14 and the two portions of the winding of the inductor 34, between the turn of the winding connected to the movable contact element 36 and the respective ends of the inductor 34, form an inductance bridge arrangement which may be balanced by actuating the movable contact element 36 in engagement with the contact elements connected to the proper turn of the windings 34 and which may be unbalanced by variation of the relative values of inductance of the inductors 17 and 19.

A transformer 40 is provided having its primary winding 42 connected to be influenced by the unbalance of the inductance bridge circuit by means of a circuit which extends from the movable contact element 36 through conductor 44, the winding 42, and conductor 46 which is connected to the point of connection between the coils 12 and 14 of the strain gauge unit 10.

A current responsive instrument 48 is connected across the secondary winding 56 of the transformer by a circuit which extends from one terminal of the instrument 48 through conductor 50, a variable resistor 52, conductor 54, the secondary winding 56 of the transformer 40, conductor 58, condenser 60 and conductor 62 which is connected to the other terminal of the instrument 48. The instrument 48 may be an indicating instrument, a recording instrument, or both an indicating and a recording instrument. It may be calibrated as desired, to indicate or record the strain that is being measured. The variable resistance 52 is provided for calibrating the instrument 48 by so adjusting the impedance in the circuit of the instrument as to cause the instrument to give a true indication of the strain which is being measured.

5. The transformer 40 has such a ratio as will balance the effective resistances of the circuits connected in circuit with its primary and secondary windings. Generally, the instrument 48 will have a much greater effective resistance than the effective resistance of the inductance bridge circuit comprising inductors 17, 19 and 34 and the ratio of the turns of the windings 56 to the ratio of the turns of the winding 42 will be such as to balance these resistances to thus provide a maximum current flow to the instrument 48 for a given degree of unbalance of the inductance bridge circuit.

The condenser 60 is provided to compensate the inductances in the circuits and is of such a value as to provide a minimum impedance, and thus a maximum flow of current to the instrument 48 for a given degree of unbalance of the inductance bridge circuit. It is to be understood that the transformer 40 may be omitted in the event that the instrument 48 has approximately the same effective resistance as the effective resistance of the bridge circuit.

In describing the operation of the device it may be assumed that it is desired to measure the elongation of the member 32 between the points on this member to which the strain gauge unit is attached by the bolts 28 and 30 as shown in Fig. 2. Elongation of the member 32 will cause the armature 24 to move away from the core member 16 and toward the core member 18 to thus decrease the inductance of the inductor 17 and increase the inductance of the inductor 19. It will be seen that this will unbalance the inductance bridge circuit shown in Fig. 1 and will cause current to flow in the primary winding 42 of the transformer 40 proportional to the degree of unbalance. The energization of the primary winding 42 of the transformer 40 will, in turn, cause the energization of the secondary winding 56 of this transformer and will thus energize and actuate the instrument 48 an amount proportional to the degree of unbalance of the inductance bridge.

In order to establish minimum impedance in the circuits, the inductance bridge circuit may first be balanced by the proper positioning of the movable contact element 36, then unbalanced by moving the armature 24 with respect to the core members 16 and 18 and then providing such a value of capacity of the condenser 60 as will produce a maximum reading of the instrument 48. The calibration of the instrument 48 may be adjusted by adjusting the variable resistor 52 to produce indications on the scale of the instrument 48 which coincide with the actual measured strains effecting the strain gauge unit 10.

It is to be understood that the inductance bridge may be a capacitance bridge with suitable capacitors substituted for the inductances 12 and 14, and the invention is to be considered as including such an arrangement.

It is to be further understood that in the event that the effective resistance of the instrument 48 is much lower than the effective resistance of the inductance bridge circuit the primary winding 42 of the transformer 40 must have a greater number of turns than the secondary winding 56 to properly balance the effective resistances in the circuits of the primary and secondary winding of the transformer 40. In this event, the condenser 60 would be connected in circuit with the primary winding of the transformer 40, since the minimum capacity of condenser 60 will be required when the condenser is connected in the circuit of that winding of the transformer 40 which has the greater number of turns.

It is also to be understood that any suitable strain gauge unit may be used in this system so long as response to strain produces a variation in the relative inductances of the inductors 17 and 19. For instance, one of these inductors may have a fixed inductance and not be associated with the strain gauge unit while the strain gauge unit is made to vary the inductance of the other inductor. In a like manner, the inductor 34 may comprise a fixed inductor and a variable inductor, the variable inductor being used to produce the proper relative value of inductance to balance an inductance bridge.

It will be seen that we have provided a strain gauge circuit which will function to produce a maximum energizing current for an indicator in response to a given amount of strain to be measured, which shall be simple and efficient in operation and adjustment, which shall require a minimum number of parts and which shall be inexpensive to manufacture, install and maintain.

In compliance with the requirements of the patent statutes, we have shown and described herein the preferred embodiment of our invention. It is to be understood, however, that the invention is not limited to the precise construction shown and described, but is capable of modification by one skilled in the art, the embodiment herein shown being merely illustrative of the principles of our invention.

We claim as our invention:

1. In a strain gauge having a pair of inductors the relative values of which are varied in accordance with a strain to be measured, a tapped inductor having movable contact means for selectively varying the relative values of inductance of the parts of said tapped inductor between said contact means and the respective ends of said inductor, means applying an alternating potential across the ends of said tapped inductor and across said pair of inductors connected in series circuit relation, and current responsive means connected between said movable contact means and the connection between said pair of inductors, said current responsive means comprising a transformer, a current responsive instrument in said transformer secondary circuit, said instrument having a higher resistance than said inductor circuit, said transformer having a substantially fixed ratio of such a value as to match the resistances of its primary and secondary circuits, and a condenser connected in the secondary circuit of said transformer having such a capacity as to compensate the effective reactance of the inductors in the primary and secondary circuits of the transformer.

2. In a strain gauge having a pair of main inductors the relative inductance values of which are varied in accordance with a strain to be measured, a pair of auxiliary inductors, means for selectively varying the relative inductance values of said auxiliary inductors, means connecting said pair of main inductors and said pair of auxiliary inductors in an inductance bridge circuit in such a manner as to permit balancing the bridge by the aforementioned selective variation of the relative inductance values of said auxiliary inductors and to cause unbalance of the bridge in accordance with variations of the relative inductance values of the pair of main inductors, a transformer having one of its windings connected across the bridge circuit to be energized in accordance with the degree of unbalance of the bridge circuit, and a current responsive instrument in circuit with the other winding of said transformer, said transformer having a substantially fixed ratio of such a value as to match the resistances in the circuits of its respective windings, and capacitive reactance means connected in that transformer winding circuit having the greater resistance, said capacitive reactance means having such capacity as to compensate the effective inductive reactance of the bridge and instrument circuits.

3. In a strain gauge circuit for a magnetic strain gauge having a pair of inductors the relative inductance values of which are varied in accordance with a strain to be measured, a tapped inductor having movable contact means cooperating with the taps for selectively varying the relative inductance values of the parts of the tapped inductor between said contact means and the respective ends of the inductor, means applying an alternating potential across the ends of said tapped inductor and across said pair of inductors connected in series circuit relation, a transformer, a first series circuit extending from said contact means through the primary winding of said transformer to the connection between the pair of inductors, a current responsive instrument, a condenser, and a second series circuit including the secondary winding of said transformer, said instrument and said condenser, the ratio of said transformer being substantially constant and of such a value as to match the effective resistances of said first and second series circuits, and said condenser having such capacity as to compensate the effective inductances in said circuits.

STEPHEN L. BURGWIN.
BERNARD F. LANGER.